C. MILLER.
Spindle Bush.
No. 102,848.  Patented May 10, 1870.
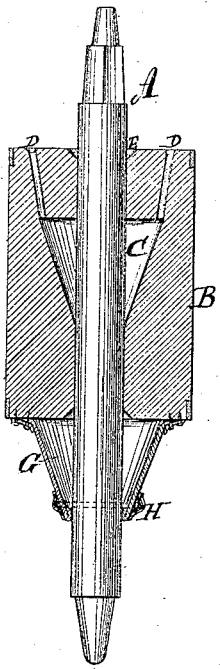
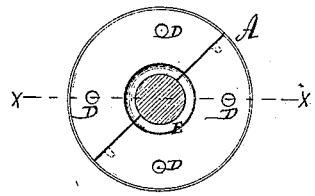 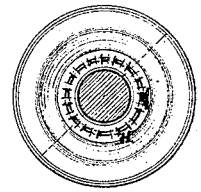
Witnesses:
A. Bennecendorf
L. S. Mabee
Inventor:
C. Miller
Per Munn & Co
Attorneys.

UNITED STATES PATENT OFFICE.

CARL MILLER, OF SANDOVAL, ILLINOIS.

IMPROVEMENT IN SELF-PACKING BUSHES FOR SPINDLES.

Specification forming part of Letters Patent No. 102,848, dated May 10, 1870.

*To all whom it may concern:*

Be it known that I, CARL MILLER, of Sandoval, in the county of Marion and State of Illinois, have invented a new and useful Improvement in Self-Packing Bush; and I do hereby declare that the following is a full, clear, and exact description thereof, which will enable others skilled in the art to make and use the same, reference being had to the accompanying drawings, forming part of this specification.

This invention relates to a new and useful improvement in a self-packing bush for mill-spindles; and it consists in the construction and arrangement of parts hereinafter described.

In the accompanying drawings, Figure 1 represents a vertical longitudinal section of the bush as applied to a mill-spindle, the section on the line $x\,x$ of Fig. 2. Fig. 2 is a top view, and Fig. 3 is a bottom view, of Fig. 1.

Similar letters of reference indicate corresponding parts.

A is the spindle, which is constructed and operated in the ordinary manner.

B is the bush around the spindle, made of wood or other suitable material, with a cavity or recess, C, for containing the packing. The bush may be made in two or more sections, or in any convenient manner.

D represents holes from the top communicating with the recess C, designed as vents to the filling.

E is a cup around the spindle, for making the bush self-filling.

G is a holder or soft funnel-shaped attachment at the bottom of the bush for retaining the packing. The mouth of this holder is laced around the spindle, as seen at H.

Having thus described my invention, I claim as new and desire to secure by Letters Patent—

The combination, with the bush B, having a cavity, C, with vent-holes D, of the holder G, substantially as and for the purpose specified.

CARL MILLER.

Witnesses:
P. H. EDWARDS,
M. KLEIN.